(12) United States Patent
Greiffenhagen et al.

(10) Patent No.: US 7,079,992 B2
(45) Date of Patent: Jul. 18, 2006

(54) SYSTEMATIC DESIGN ANALYSIS FOR A VISION SYSTEM

(75) Inventors: Michael Greiffenhagen, Wolfratshausen (DE); Visvanathan Ramesh, Plainsboro, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 769 days.

(21) Appl. No.: 10/166,229

(22) Filed: Jun. 5, 2002

(65) Prior Publication Data

US 2003/0095702 A1 May 22, 2003

Related U.S. Application Data

(60) Provisional application No. 60/295,979, filed on Jun. 5, 2001.

(51) Int. Cl.
*G06F 7/60* (2006.01)
*G03B 13/00* (2006.01)

(52) U.S. Cl. ............................ 703/2; 348/143; 340/541
(58) Field of Classification Search ................... 703/2; 348/143; 340/541
See application file for complete search history.

(56) References Cited

U.S. PATENT DOCUMENTS 6,690,414 B1* 2/2004 Lyons et al. ................ 348/156
6,744,462 B1* 6/2004 Gutta et al. .................. 348/143
2002/0070859 A1* 6/2002 Gutta et al. .................. 340/541
2002/0113687 A1* 8/2002 Center et al. ............... 340/5.82
2002/0171736 A1* 11/2002 Gutta et al. .................. 348/143
2004/0246336 A1* 12/2004 Kelly et al. .................. 348/143

OTHER PUBLICATIONS

Greiffenhagen, M., V. Ramesh, D. Comaniciu, & H. Niemann. "Statistical Modeling and Performance Characterization of a Real-Time Dual Camera Surveillance System." Proc. IEEE Conf. on Computer Vision and Pattern Recognition, 2000. Jun. 13-15, 2000. pp. 335-342.*
Greiffenhagen, M., V. Ramesh, and H. Niemann. "The Systematic Design and Analysis Cycle of a Vision System: A Case Study in Video Surveillance." Proc. of the 2001 IEEE Conf. on Computer Vision and Pattern Recognition, 2001. Dec. 9-14, 2001. vol. 2, pp. 70.*

(Continued)

*Primary Examiner*—Paul L. Rodriguez
*Assistant Examiner*—Ayal Sharon
(74) *Attorney, Agent, or Firm*—Donald B. Paschburg; F. Chau & Associates, LLP

(57) ABSTRACT

A technique is disclosed for building a vision system. Reusable components and replacement components of an existing vision system are identified. The replacement components may be modules that are influenced by the relaxation in application constraints. Statistical characterization is performed on the replacement components (or the hybrid design variations obtained by fusing modules with the replacement modules). Wrappers are developed that provide statistical consistency with existing interfaces and are integrated into the new vision system.

14 Claims, 4 Drawing Sheets

OTHER PUBLICATIONS

Greiffenhagen, M. "Engineering, Statistical Modeling and Performance Characterization of a Real-Time Dual Camera Surveillance System." Doktor-Ingenieur Dissertation. Erlangen, Germany. 2002. (Table of Contents and Acknowledgements).*

IEEE Computer Society Conf. on Computer Vision and Pattern Recognition. Dec. 9-14, 2001. http://vision.cse.psu.edu/cvpr2001/NewPage/confhome.htm.*

Stauffer, C. and W.E.L. Grimson. "Adaptive Background Mixture Models for Real-Time Tracking." Proc. IEEE Conf. on Computer Vision and Pattern Recognition, 1999. Jun. 23-25, 1999. vol. 2, pp. 246-252.*

Greiffenhagen, M. et al. "Design, Analysis, and Engineering of Video Monitoring Systems: An Approach and a Case Study." Proc. of the IEEE. Oct. 2001, vol. 89, Issue 10, pp. 1498-1517.*

Cui, Y. et al. "Indoor Monitoring Via the Collaboration Between a Peripheral Sensor and a Foveal Sensor." Proc. 1998 IEEE Workshop on Visual Surveillance. Jan. 2, 1998. pp. 2-9.*

"General Distributions—From MathWorld". http://mathworld.wolfram.com/topics/GeneralDistributions.html. Printed Sep. 21, 2005.*

"Discrete Distributions—From MathWorld". http://mathworld.wolfram.com/topics/DiscreteDistributions.html. Printed Sep. 21, 2005.*

"Continuous Distributions—From MathWorld". http://mathworld.wolfram.com/topics/ContinuousDistributions.html. Printed Sep. 21, 2005.*

Visvanathan Ramesh et al., "Computer Vision Performance Characterization," pp. 241-282.

* cited by examiner

SYSTEMATIC DESIGN ANALYSIS FOR A VISION SYSTEM

CROSS REFERENCE TO RELATED APPLICATIONS

This application claims the benefit of U.S. Provisional Application No. 60/295,979, filed Jun. 5, 2001.

FIELD OF THE INVENTION

The present invention relates to computer vision techniques and, more particularly, to methods and systems for the systematic engineering of vision systems.

BACKGROUND OF THE INVENTION

The computer vision field is at a stage where complete systems are increasingly being developed and tested for a variety of real-world applications. Statistical estimation/classification methods are increasingly the choice for these systems. This is because they provide flexibility in modeling, performance characterization, validation and adaptation through sequential estimation.

The systems analysis phase of performance characterization has been studied to some degree in the literature. However, the systems design phase and the interaction between systems design, analysis, test, and re-design cycle has not been explored in great detail.

Referring to FIG. 1, the system design and analysis phases for a vision system are shown. The typical scenario in an industrial research and development unit developing vision systems is that a customer defines a system specification and its requirements (102). An engineer then translates these requirements to a system design (110) and validates that the system design meets the user-specified requirements. Further, the process usually involves creating a system configuration (120), analyzing and optimizing the system (130), and performing performance characterization (140).

The system requirements in the video analysis setting often involves the specification of the operating conditions, the type of sensors, the accuracy requirements, and the computational requirements to be met by the system. The main problem, however, is that there is no known systematic way for vision systems engineers to go about doing this translation of the systems requirements to a detailed design. It is still an art to engineer systems to meet given application specific requirements. There are two fundamental steps in the design process: the choice of the system architecture and the modules for accomplishing the task, and the statistical analysis and validation of the system to check if it meets user requirements. In real-life, the system design and analysis phases typically follow each other in a cycle until the engineer obtains a design and an appropriate analysis that meets the user specifications. Automation of the design process is a research area with many open issues, although there have been very limited studies in the context of image analysis (e. g., automatic programming). The systems analysis (performance characteristics) or evaluation phase for vision systems is an active area of research in the last few years.

SUMMARY OF THE INVENTION

A technique is disclosed for building a vision system. Reusable components and replacement components of an existing vision system are identified. The replacement components may be modules that are influenced by the relaxation in application constraints. Statistical characterization is performed on the replacement components (or the hybrid design variations obtained by fusing modules with the replacement modules). Wrappers are developed that provide statistical consistency with existing interfaces and are integrated into the new vision system.

These and other aspects, features and advantages of the present invention will become apparent from the following detailed description of preferred embodiments, which is to be read in connection with the accompanying drawings.

DESCRIPTION OF PREFERRED EMBODIMENTS

One of the major issues in vision systems research is to identify how maximal re-use of components or system configurations can be achieved when one relaxes the operating constraints of a system. We wish to study this problem by examining how re-use can be achieved when a system is designed and analyzed by following a systematic engineering methodology.

Assuming that a system has been designed, analyzed, and tested for a given restricted application scenario, the question we would like to ask is how one can adapt the system to operate under a less restrictive input condition. In order to adapt the system configuration to meet extended system requirements one has to identify how a change in requirement influences the existing modules and the system architecture. A redesign of all modules affected is an option. Another way is to utilize third party modules to replace existing ones. To retain the advantages derived by following a systematic methodology during the design and analysis phases of the original system one has to choose external modules that satisfy the following constraints:

1) They should be amenable to statistical analysis so that a probabilistic fusion of the component with the existing system is feasible, and
2) They should facilitate ease of re-use of previous modules and their performance analysis.

The first point is important in order to be within the systems engineering formalism. Moreover, it is necessary to identify how the probabilistic fusion of two different modules addressing the same task can be fused to derive hybrid solutions that meet the new requirements. If one represents the system as an execution graph wherein the nodes are data structures and the edges correspond to the transformations, a statistical characterization is associated with each edge in the graph. The total system analysis essentially provides the relationship between the final output statistics and the input statistics as a function of all the system parameters. The replacement of a module within the larger system corresponds to the change of an edge in the graph. In order for the total systems analysis performed in the previous cycle to be re-usable, one has to choose a new module that satisfies the statistical distribution conditions for the input and output data types. Thus, the second point is needed to not re-do the entire system analysis phase as a result of modification of the input/output distribution in one module of the system. In situations where no existing external module satisfies this constraint, we propose to devise a wrapper transformation that essentially molds the external module and makes its statistical interfaces consistent with the existing framework.

Figure 1:
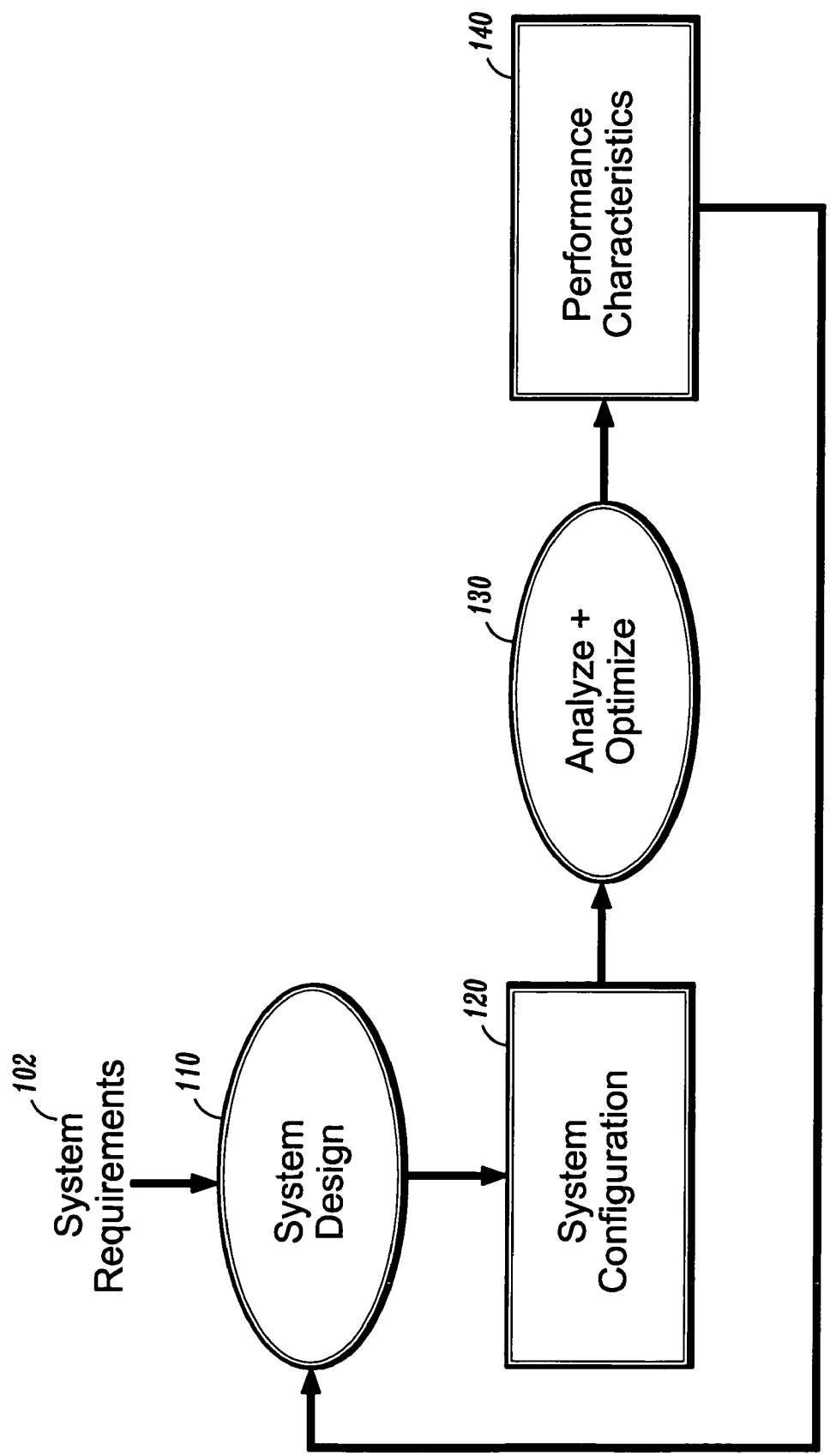
FIG. 1 is a diagram illustrating the system and design phases for a vision system.
Figure 2:
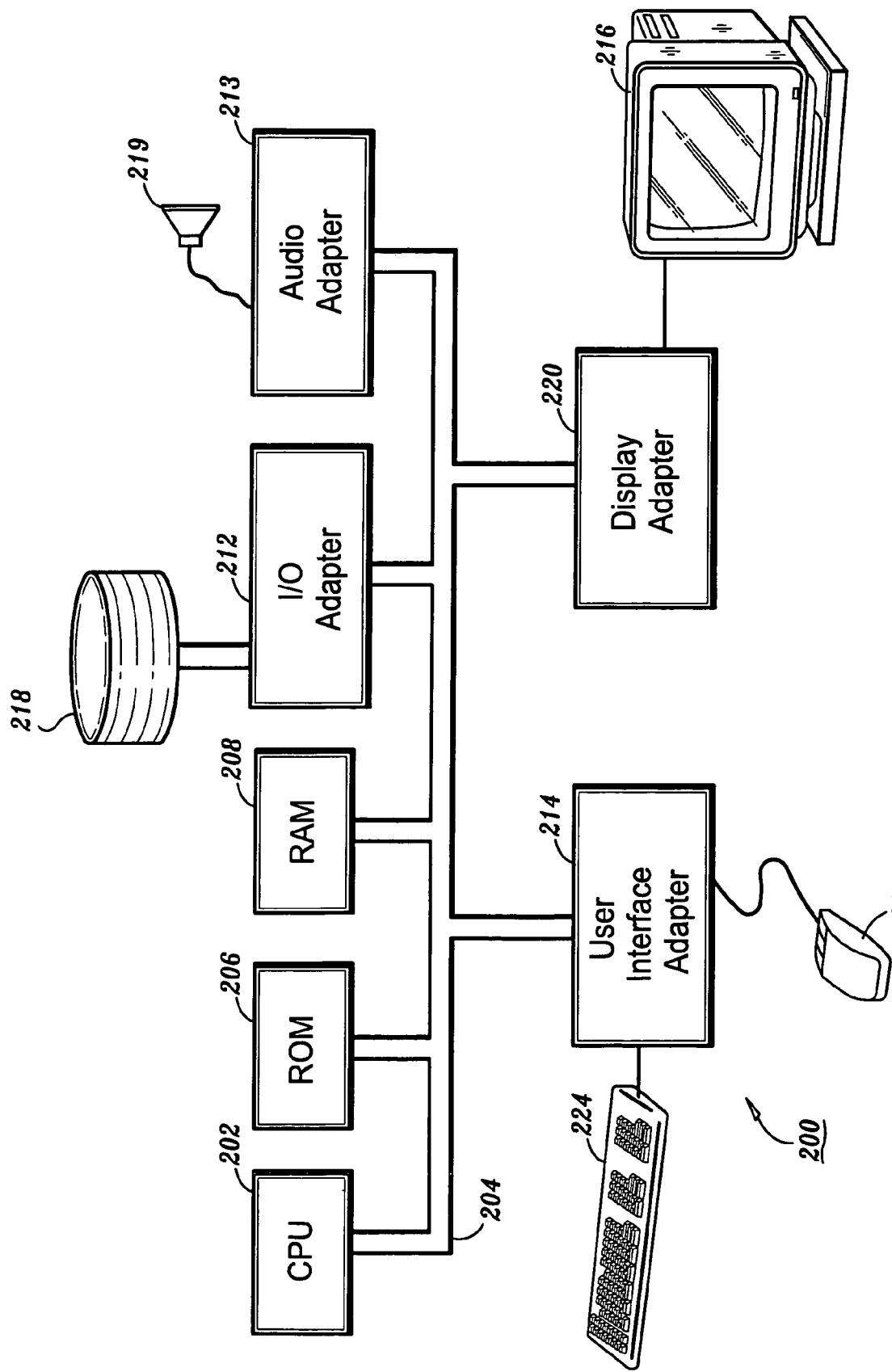
FIG. 2 is a block diagram of a computer processing system to which the present invention may be applied according to an embodiment of the present invention.

FIG. 2 is a block diagram of a computer processing system 200 to which the present invention may be applied according to an embodiment of the present invention. The system 200 includes at least one processor (hereinafter processor) 202 operatively coupled to other components via a system bus 204. A read-only memory (ROM) 206, a random access memory (RAM) 208, a display adapter 210, an I/O adapter 212, an audio adapter 213, and a user interface adapter 214 are operatively coupled to the system bus 204.

A display device 216 is operatively coupled to system bus 204 by the display adapter 210. A disk storage device (e. g., a magnetic or optical disk storage device) 218 is operatively coupled to the system bus 204 by the I/O adapter 212. A speaker 219 is operatively coupled to the system bus 204 by the audio adapter 213.

A mouse 220 and a keyboard 224 are operatively coupled to the system bus 204 by the user interface adapter 214. The mouse 220 and the keyboard 224 are used to input and output information to and from the system 200.

Those skilled in the art will recognize that the exemplary computer processing system 200 illustrated in FIG. 2 is not intended to limit the present invention. Those skilled in the art will appreciate that other alternative computing environments may be used without departing from the spirit and scope of the present invention.

Figure 3:
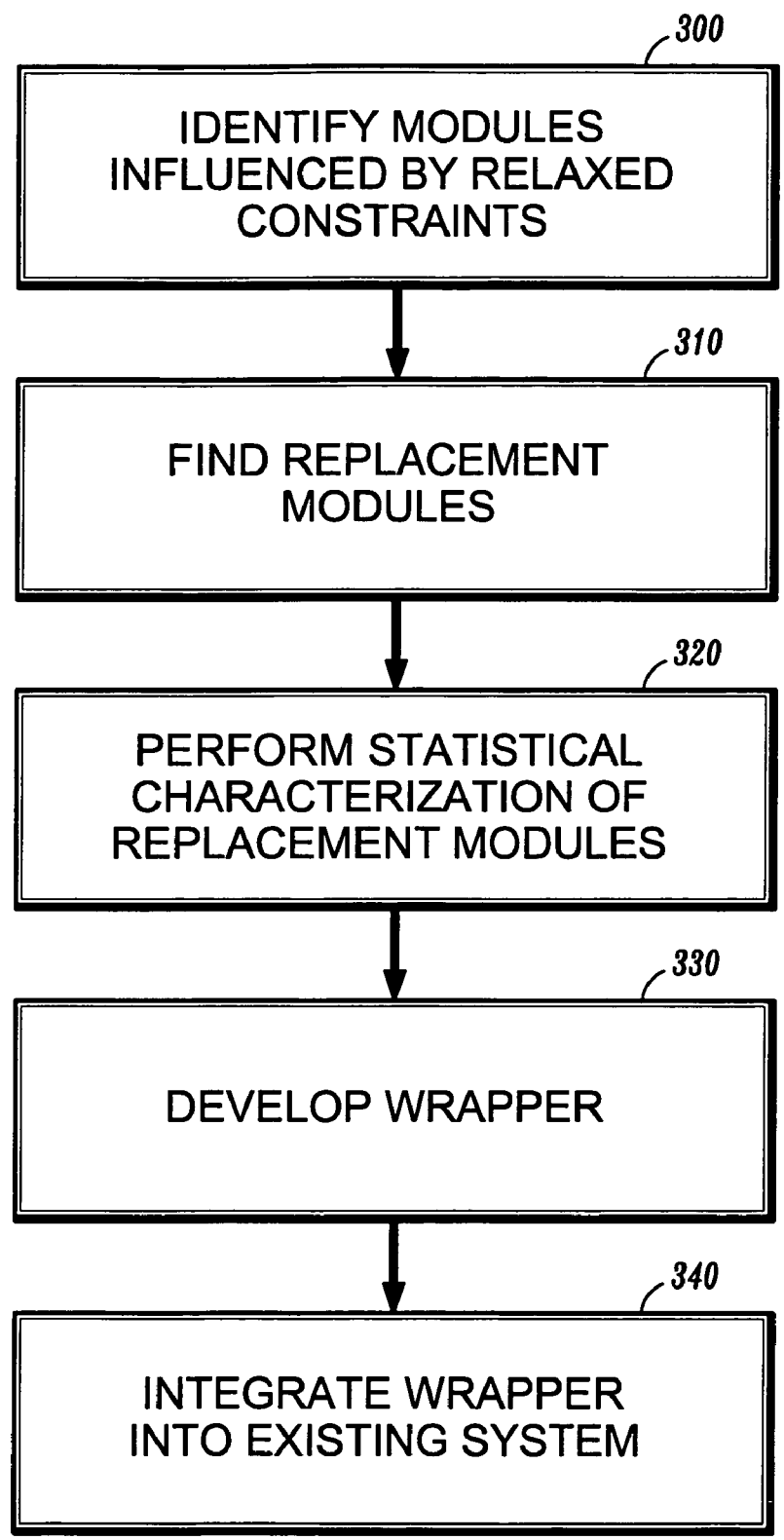
FIG. 3 is a diagram illustrating a wrapper transformation technique in accordance with an embodiment of the present invention.

Referring to FIG. 3, the wrapper transformation approach includes identifying modules influenced by the translation of the relaxation in the application constraints (300), finding modules that satisfy the engineering constraints mentioned above (310), performing statistical analysis characterization of the replacement modules (or their hybrid design variations obtained by fusing existing modules with the replacement modules) (320), developing a wrapper that enables us to integrate it with the existing system with no re-analysis phase (330), and integrating the wrapper into the existing system (340). Once the design is accomplished, the validation and test phase follows.

The present invention discusses the statistical modeling and performance characterization of a dual-camera surveillance system. More particularly, we develop a system configuration so that application specific priors in the 3D geometry, camera geometry, the illumination model parameters, and object interaction/motion parameters are taken into account during the design of the object detection and zooming system. Further, we describe how it is possible to meet various real-time constraints while satisfying accuracy constraints (under certain restrictive assumptions). We illustrate how the application specific priors influence the choice of the system architecture and illustrate how perturbations can be propagated through the chosen surveillance system configuration involving change detection, people detection, people location determination and camera parameter estimation. The system estimates the foot positions and head positions of persons in omni-directional camera video and uses a foveal camera (a standard pan-tilt perspective camera) to zoom on the persons head based on the person location information.

An objective is to describe how this system can be refined to handle less restrictive input conditions while retaining most of the original system design intact. One goal is to apply the system to quasi-outdoor settings (i. e., lobbies with external illumination) with minimal re-design and analysis effort. (See Table 1 for the relaxed constraints). If the old system was designed to handle shadow effects and changes in camera gain, the new system must also handle slow changes in the background and fast changes between multiple background modes. The system needs to operate 24 hours a day, 7 days a week in an office building entrance lobby, that is lit by artificial light during night and primarily natural light during day time.

TABLE 1

| Previous System Constraints | New System Features |
| --- | --- |
| Constant background | Changing background |
| Constant illumination | Variable illumination |
| Single mode background | Multi-modal background |
| Restricted operational in black and saturated background areas | Operational on full sensor input range |

Since the constraint being relaxed has to do with illumination, we need to replace the relevant illumination invariant module in the original system. As we will see, the original system used the prior knowledge that the scene consisted of light sources with same spectra but arbitrary intensities. No background adaptation to handle the changes in spectra was done. The relaxation of this application constraint necessitates the use of a background adaptation module. In our review of the literature, we could not find a module that satisfies the requirements that the output distribution of the background adaptation module is of the form suitable for input into our people detection module. Therefore, we developed a technique which combines the advantages of our existing change detection module with the advantages of the background adaptation algorithm by Stauffer-Grimson. We will see that this fusion itself presents differences in the output feature space. We address this by adding an augmentation module that alters the output data to be in the same feature space.

We briefly describe our illumination invariant change detection method based on normalized color. The module takes as input a vector $(\hat{R}, \hat{G}, \hat{B})^T$ which is assumed to be normal distributed with mean $(R, G, B)^T$ and covariance matrix $\Sigma = \text{diag}(\sigma_R^2, \sigma_G^2, \sigma_B^2)$, normalizes it by $\hat{S} = \hat{R} + \hat{G} + \hat{B}$ and provides a distance metric $\hat{d}^2$ between the current values $\hat{\mu}_c = (\hat{r}_c, \hat{g}_c)^T$ and a background representation $\hat{\mu}_b = (\hat{r}_c, \hat{g}_c)$ in the normalized space, where $$\hat{r} = \frac{\hat{R}}{\hat{S}}, \text{ and } \hat{g} = \frac{\hat{G}}{\hat{S}},$$

when subscripts b, c for background respectively current image are omitted. The probability of a pixel being background corresponds to the distance measure $$\hat{d}^2 = (\hat{\mu}_b - \hat{\mu}_c)^T \left(2 \sum_{\hat{r}_b, \hat{g}_b}\right)^{-1} (\hat{\mu}_b - \hat{\mu}_c) \text{ with} \quad (1)$$

$$\sum_{\hat{r}_b,\hat{g}_b} = \frac{\sigma_S^2}{S^2} \begin{pmatrix} \frac{\sigma_R^2}{\sigma_S^2}\left(1-\frac{2R}{S}\right)+\frac{R^2}{S^2}-\frac{\sigma_G^2 R+\sigma_R^2 G}{\sigma_S^2 S}+\frac{RG}{S^2} & - \\ \frac{\sigma_G^2 R+\sigma_R^2 G}{\sigma_S^2 S}+\frac{RG}{S^2} & \frac{\sigma_G^2}{\sigma_S^2}\left(1-\frac{2G}{S}\right)+\frac{G^2}{S^2} \end{pmatrix}$$

where $\sigma_S^2=(\sigma_R^2+\sigma_G^2+\sigma_B^2)$.

Note, that in the normalized space the covariance matrix $\Sigma_{\hat{r}_b,\hat{g}_b}$ for each pixel is different. This method was proved to perform very precisely and accurately in indoor situations with static illumination within our module framework, but it is not suitable for situations of varying light conditions and changes in the background. Due to the nature of normalization, this module ignores cues provided by the signal intensity. Key-features are invariance against shadows and changes in camera gain, and the notion of sensor uncertainty. Nevertheless, the miss detection rate is high in areas that are dark and saturated due to the large uncertainty in the normalized color space. It also fails when the input has no color information.

The statistical characterization for the normalized color segmentation module can be summarized as follows: For normal distributed input parameters $\hat{R}$, $\hat{G}$, $\hat{B}$, the output statistic $\hat{d}_2$ (see Equation 1) is $x^2$ distributed with two degrees of freedom for background pixels. For object pixels, $\hat{d}_2$ can be approximated by a non-central $x^2$ distribution with two degrees of freedom, and non-centrality parameter c. $\hat{d}_2$ is exactly non-central $x^2$ distributed with two degrees of freedom if the covariance matrix for background and foreground are identical.

In the paper "Adaptive Background Mixture Models for Real Time Tracking," *Proceedings of IEEE Conference on Computer Vision and Pattern Recognition*, pp. 246–252, (IEEE, 1999), Stauffer and Grimson propose a background adaptation scheme that adapts to slowly drifting multi modal background intensities. They model each pixel as a mixture of K Gaussians with weights $w_i$, means $\mu_i$, variances $\sigma_i^2$ and use an on-line approximation to update the model. They introduce a pixel labeling process, which is primarily based on the assumption that the least frequently occurring component in the mixture with large variance is more likely to be objects. This is done by the use of a threshold T that is based on the prior probability of a pixel being background. A pixel is labeled "background", if it is closest in distance to one of the top B distribution components in the mixture where $B=\arg\min_b(\Sigma_{k=0}^b w_k > T)$. The model parameters for the mode $\mu_i$, variance $\sigma_i^2$, and weight $w_i$, which represent the current data best are updated following an exponential forgetting scheme with learning constant $\alpha$. Pixels which are outside an $2.5\sigma_i$-interval around each of the K modes are labeled "object" and modeled by a new Gaussian distribution. The mean of this Gaussian corresponds to the current pixel value, the variance is initialized with a high value $\sigma_{init}^2$, its weight $w_{init}$ with a small value. The new mode replaces the background mode with least supporting evidence.

To characterize the statistical behavior of background adaptation module, we conducted numerous experiments on real data as well as on simulated data with similar results. We generated random samples from a mixture distribution with model parameters $w_i$, $\mu_i$, $\sigma_i^2$ with $i\in\{0, 1, 2, 3\}$. Table 2 shows the parameter settings used along with the ideal model parameters used. Initializations for the modes of the components were done randomly or in a deterministic fashion. For instance, in the example shown, we initialized all modes with the same parameters: $w=1.88$, $\mu=0$, $\sigma_i^2=25$ except for the first mode's mean, which we initialized with 10.

TABLE 2

| T | $W_{init}$ | $\sigma_{init}^2$ | $\alpha$ | $w_0$ | $w_1$ | $w_2$ | $w_3$ | $\mu_0$ | $\mu_1$ | $\mu_2$ | $\mu_3$ | $\sigma_0^2$ | $\sigma_1^2$ | $\sigma_2^2$ | $\sigma_3^2$ |
|---|---|---|---|---|---|---|---|---|---|---|---|---|---|---|---|
| 0.9 | 0.05 | 25.0 | 0.03 | 0.05 | 0.16 | 0.3 | 0.4 | 10 | 50 | 150 | 205 | 0.3 | 0.3 | 0.3 | 0.3 |

The experimental analysis shows that only the modes of the mixture distribution are estimated and tracked correctly. The variance and the weights are unstable and unreliable. They do not track the data and do not converge. Even though the experiment uses a random sample from a stationary mixture distribution, the variance and weights tend to oscillate arbitrarily and are frequently re-initialized. Even if we assumed that the parameters do converge, for every sample that falls outside all of the $2.5\sigma$-intervals, a new mode is introduced and initialized with a high variance and a small weight. For samples from the background mixture this occurs in approximately 1% of the cases. In other words, for every pixel the introduction of the new mode occurs on an average of less than every 10 seconds if the system processes more than 10 frames per second. Depending on the update factor $\alpha$ the model parameters $\sigma_{k,t}^2$, and $w_{k,t}$ are somewhere between the initial and the true value but do not represent the parameters of the true underlying background distribution. Since the variances are not constrained to have a lower-bound, variances from most frequently occurring modes are constantly reduced and become significantly smaller than the true variances, such that this new mode introduction happens even more often. This is not a problem in the original implementation because the weights and the variances are not used in any way in a subsequent processing step. They use connected components followed by a region size threshold to prune false detection. On the contrary, in our methodology, we need to characterize the stability of these estimates in order to determine how they can be fused to another module and do the systems analysis. Since the experiments show the mean estimates are stable, we will explicitly use this feature to develop the hybrid algorithm. We further note, that the estimated modes are approximately normal distributed such that the difference between the current measurement and the closest background mode is approximately normal distributed with zero-mean and a covariance that is different from model parameter $\sigma_i^2$.

Figure 4:
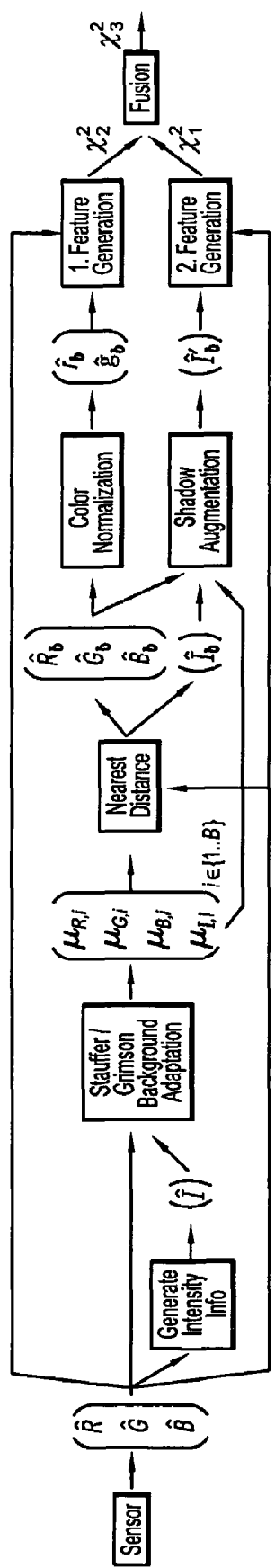
FIG. 4 is a diagram illustrating fusion of modules in accordance with an embodiment of the present invention.

We now show how to fuse two modules statistically correctly to obtain a modified system to meet the old and newly added requirements simultaneously (FIG. 4 shows the block diagram). The main essence in the fusion algorithm is as follows. The change in background is modeled as two separate effects: one is the change due to the illumination spectrum and non-linear dynamics and the other is the change due to sudden camera gain/shadow changes. The Stauffer-Grimson (SG) algorithm is ideally suited to deal with changes in the illumination spectrum and slow dynamics, while the normalized color change detection algorithm is invariant to gain and shadows. By using SG algorithm first and feeding its internal state to the normalized color change detection algorithm we gain the advantages of both. We still have two issues to contend with: a) the SG algorithm does not discriminate between shadows and objects and b) the normalized color module fails when the input signal has no color and its discrimination power diminishes in dark and saturated areas. We will show that these problems can be solved by augmenting the SG algorithm to handle shadow information and by proper statistical fusion of the two algorithm outputs. The added requirement is that after we have done the fusion the output of the fused algorithm must have the same output distribution suitable for integration into the original system.

We have seen that an analysis of the Stauffer-Grimson module demonstrated that the modes of the mixture are stable within a time window. Further the distribution of estimated modes can be approximated by normal distributions thus matching the input distributional assumptions for the normalized color module. Therefore, we can use these estimates to compute $\mu_b$ and $\Sigma_{\hat{r}_b,\hat{g}_b}$ in our normalized-color background model. Formally, given a current pixel measurement $\hat{v}_c$, let the background mode from the SG algorithm mixture distribution closest in distance to the current measurement be $\mu_{min}$, then $\mu_b = (\hat{r}_{min}, \hat{g}_{min})$ the normalized color values for the RGB vector $\mu_{min}$. The covariance matrix $\Sigma_{\hat{r}_b,\hat{g}_b}$ is still the same as in the previous section description (dependent only on the sensor noise and the means value $\mu_{min}$). Let $\hat{mu}_c$ correspond to the normalized color vector corresponding to the measurement $\hat{v}_c$. The Mahalanobis distance $\hat{d}^2$ between the current normalized color value obtained from $\hat{\mu}_c$ and $\mu_b$ is used as the shadow/gain invariant change detection measure. The distribution of this statistic is approximately chi-squared distributed with 2 degrees of freedom.

As discussed above, the normalized color information should be augmented with intensity information to deal with dark/saturated areas and when no color information is present in the signal. Therefore, we apply the Stauffer-Grimson algorithm also to gray scale values $I=(R+G+B)/3$ and search for representation which allows statistically correct fusion of the two representations. The SG algorithm is not designed to distinguish between shadow and object pixels. They are both labeled as object, since they occur simultaneously and have large variance. Therefore, we add a computational test that augments the grayscale background state model in SG to include a shadow component. Under this assumption that shadow pixel values are multiplicative factors (identical in each color band) of the corresponding background color, pixels that are labeled as non-background pixels by the original SG algorithm are further classified as being shadow or object. This is done based on a classical statistical hypothesis test for the current pixel being shadow. Along with a label, this method also provides a probability that the given label is correct. Formally, the number of background modes is augmented to be B+1 where the last mode is the shadow mode. Let $\mu_i$, $i=1,\ldots,B+1$'s denote the means of background mixture model for a given pixel. The distance between the current intensity value $\hat{I}_c$ and the closest $\mu_i$'s, denoted by $\hat{I}_b$, is used as the change detection measure. Denote this minimum distance by d'. The distribution of this statistic is also approximated by a Gaussian distribution. Note that the $\sigma$ values provided by SG algorithm are not used in this distance measure because of their instability. Moreover, the variance of the estimated mode is not the same as the variances of the components of the mixture. The variance of the estimated mode is obtained through an analysis of the empirical distribution of d' for the background pixels. The local fluctuations in the modes of the mixture distribution (within a small window of time) are primarily assumed to be due to a global illumination effect such as camera gain. Therefore, the trimmed standard deviation of the histogram of d' is used as an estimate of the standard deviation ($\sigma_{\hat{I}_b}$) of $\hat{I}_b$.

The final goal is to statistically fuse the normalized color feature with the shadow invariant intensity feature such that the new feature statistic has the same characteristic as the old one. This is important in order to ensure that the modules which follow in the original system and take this new statistic as input can still be used, and the systems analysis conducted earlier remains valid. Therefore, we need to find a feature for the augmented intensity representation that will provide a change detection measure that is $x^2$ distributed, since the original test statistic $\hat{d}^2$ was also $x^2$ distributed (see Equation 1). Knowing from the analysis that the means are stable and approximately normal distributed, we define a Mahalanobis distance $\hat{d}'^2$ similar to $\hat{d}^2$ as proposed in Equation 1:

$$\hat{d}'^2 = \begin{pmatrix} \hat{r}_b - \hat{r}_c \\ \hat{g}_b - \hat{g}_c \\ \hat{I}_b - \hat{I}_c \end{pmatrix}^T \left(2 \sum_{\hat{r}_b, \hat{g}_b, \hat{I}_b}\right)^{-1} \begin{pmatrix} \hat{r}_b - \hat{r}_c \\ \hat{g}_b - \hat{g}_c \\ \hat{I}_b - \hat{I}_c \end{pmatrix} \text{ with}$$

$$\begin{pmatrix} \hat{r}_b - \hat{r}_c \\ \hat{g}_b - \hat{g}_c \\ \hat{I}_b - \hat{I}_c \end{pmatrix} \sim N\left(\begin{pmatrix} \mu_b - \mu_c \\ I_b - I_c \end{pmatrix}, 2\sum_{\hat{r}_b, \hat{g}_b, \hat{I}_b}\right)$$

with $I_c$ denoting the current intensity value and $I_b$ denoting the mode in the background mixture that is closest to $I_c$. Experiments show that the correlation between normalized color representation and the intensity based mixture model is negligible such that the new change detection measure:

$$\hat{d}'^2 = \hat{d}^2 + \frac{(\hat{I}_b - \hat{I}_c)^2}{2\sigma_{\hat{I}_b}^2}$$

where $\hat{d}^2$ is identical with the output of the change detection module for normalized color. Thus, we know that under the given conditions $\hat{d}'^2$ is approximately central $x^2$ distributed with 3 degrees of freedom for object pixels. This shows that the distributional form of the statistic which serves as input for the next module in our original system remains the same and the modules may remain untouched. The only difference is in the parameter of the distribution. The number of degrees of freedom changes from 2 to 3 in this case.

We have verified that new modifications to the system results in output statistics that are the same as that required by other components in our original system. Therefore, the systems analysis for the original system remains untouched and there is no need to re-do the theoretical analysis and validation experiments. However, we do need to check whether the approximation error introduced in the new module affect the final performance of the system and verify this in real experiments.

Our real experiments followed a similar protocol. The correctness of the pan, tilt, and zoom parameters estimated by our modules are compared against ground truth values of these control parameters to estimate the mean and variances of the running system. First, we marked six position P1–P6 of different radial distances and pan angles. Position, and test persons were chosen to simulate different positions, illuminations, and contrast. In the following table, we show the final foveal camera control parameters for one person. Ground truth values for the mean values were taken by measuring tilt angle $\alpha$, and pan angle $\beta$ by hand, and are compared against the corresponding mean of system measurements estimated from 100 trials per position and person. The variances calculated by the system for pan and tilt angles are compared against the corresponding variance-estimates calculated based on the theoretical analysis. The comparison between system output and ground truth demonstrates the closeness between theory and experiment (Table 3). The camera control parameters as well as the zoom parameter are functions of the geometry, as well as of the current uncertainties in the position estimates of the person. The more certain the estimate the more we can afford to zoom in. The uncertainties are functions of the current scene, quality of segmentation, geometry, and calibration uncertainties.

TABLE 3

| $\times 10^{-5}$ | P1 | P2 | P3 | P4 | P5 | P6 |
|---|---|---|---|---|---|---|
| $\tilde{\sigma}_{\sin\beta}^2$ | 37.3 | 35.9 | 63.1 | 83.0 | 142 | 220 |
| $\sigma_{\sin\beta}^2$ | 36.4 | 38.1 | 112 | 60.5 | 139 | 221 |
| $\tilde{\sigma}_{\tan\alpha}^2$ | 0.332 | 0.211 | 0.128 | 0.255 | 0.825 | 0.932 |
| $\sigma_{\tan\alpha}^2$ | 0.271 | 0.206 | 0.120 | 0.252 | 0.832 | 0.904 |

One objective was to study the engineering design and test cycle through a case study involving the systematic engineering of a dual-camera video surveillance system for people detection and zooming. An important point we wish to make is that by following rigorous systematic engineering principles, one can minimize re-design and analysis efforts required to extend functionality of a vision system. The key conclusion is that by choosing appropriate modules and suitable statistical representations, we are able to re-use existing system design, software, and performance analysis results. We demonstrated this in the context of a dual-camera surveillance system for people detection and zooming. A new change detection algorithm fusing two different change detection algorithms was devised. One dealt with camera gain changes and shadows, while another dealt with dynamic illumination changes. The strengths of both these algorithms were retained, while their individual limitations were compensated by each other. The integration was done by paying attention to how the change detection component interfaces with the rest of the existing system. The system was successfully tested in the lobby scenario and was able to deal with shadows, gain control changes, dark and saturated measurements, and varying illumination conditions (over 24 hours per day, night, natural and artificial lighting). High sensitivity was achieved in detection while retaining precise and data-driven adaptive zooming of a person's head.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A computer-implemented method for extending a computer-vision system comprising:
    representing the computer-vision system as an execution graph,
    wherein the computer-vision system comprises a camera for capturing an image as an input, at least one image processing module for processing the image and generating an output,
    wherein the execution graph comprises a plurality of nodes, each node corresponding to a data structure of the image between the input and the output, and a plurality of edges, connecting the plurality of nodes, corresponding to a transformation of each data structure, wherein a statistical characterization is associated with each edge;
    representing a change in the computer-vision system as a change in an edge and the associated statistical characterization;
    verifying that the change in the computer-vision system satisfies a statistical distribution condition for the input and the output of the computer-vision system; and
    implementing an extended computer-vision system including the change,
    wherein the output is one of an indication of change detection in the image, an indication of people detection in the image, an indication of people location in the image, or an indication of camera parameter estimation.

2. The computer-implemented method of claim 1, wherein the change is a function of an additional image processing module.

3. The computer-implemented method of claim 1, wherein the change is a function of an additional image processing module replacing an existing image processing module of the computer-vision system.

4. The computer-implemented method of claim 1, further comprising:
    determining that the computer-vision system including the change does not satisfy the statistical distribution condition for the input and the output;
    identifying an affected image processing module, wherein the affected image processing module causes the computer-vision system not to satisfy the statistical distribution condition for the input and the output due to the change; and
    wrapping a transformation corresponding to the affected image processing module such that the statistical characterization is made to conform to the statistical distribution condition for the input and the output due to the change.

5. The computer-implemented method of claim 1, wherein the image processing module is a first illumination invariant image processing module.

6. The computer-implemented method of claim 5, wherein the change is a results of a second illumination invariant image processing module.

7. The computer-implemented method of claim 6, wherein the first and the second illumination invariant modules are fused to extend the computer-vision system, wherein a fused module has an output distribution which satisfies the statistical distribution condition for the input and the output due to the change when implemented in the computer-vision system.

8. The computer-implemented method of claim 7, wherein the first and the second illumination invariant modules are a color normalization module and a shadow augmentation module, respectively.

9. The computer-implemented method of claim 4, wherein wrapping the transformation corresponding to the affected image processing module comprises altering a statistical interface of an additional image processing module corresponding to the change.

10. The computer-implemented method of claim 1, wherein verifying that the change in the computer-vision system satisfies the statistical distribution condition for the input and the output of the computer-vision system comprises determining an approximation error introduced by the change to the output of the computer-vision system.

11. An extended computer-vision system comprising:
at least one camera for capturing a image;
a first image processing module;
a second image processing module fused with the first image processing module, wherein an output of a fused image processing module comprising the first and the second image processing modules satisfies a statistical distribution condition for the input and the output for the first image processing module alone; and
an output of the extended computer-vision system, wherein the output is one of an indication of change detection in the image, an indication of people detection in the image, an indication of people location in the image, or an indication of camera parameter estimation.

12. The extended computer-vision system of claim 11, wherein the first and the second image processing modules are illumination invariant modules.

13. The extended computer-vision system of claim 11, wherein the first and the second image processing modules are illumination invariant modules.

14. The extended computer-vision system of claim 13, wherein the first and the second image processing modules are a color normalization module and a shadow augmentation module, respectively.

* * * * *